(12) United States Patent
Hahn (10) Patent No.: US 8,096,921 B2
(45) Date of Patent: Jan. 17, 2012

(54) INTEGRATED PARKING BRAKE AND CLUTCH CONTROL SYSTEM

(75) Inventor: Timothy Adam Hahn, Woodstock, OH (US)

(73) Assignee: Honda Motor Company, Ltd., Tokyo (JP)

( * ) Notice: Subject to any disclaimer, the term of this patent is extended or adjusted under 35 U.S.C. 154(b) by 458 days.

(21) Appl. No.: 12/480,201

(22) Filed: Jun. 8, 2009

(65) Prior Publication Data
US 2010/0307856 A1     Dec. 9, 2010

(51) Int. Cl.
| | |
|---|---|
| B60W 10/00 | (2006.01) |
| B60W 10/02 | (2006.01) |
| B60W 10/18 | (2006.01) |
| F16D 48/06 | (2006.01) |
| F16D 67/02 | (2006.01) |
| F16D 11/10 | (2006.01) |
| F16D 23/12 | (2006.01) |
| G05G 11/00 | (2006.01) |
| G05G 1/00 | (2008.04) |

(52) U.S. Cl. ... 477/170; 477/171; 192/13 R; 192/114 R; 74/490.14; 74/490.15; 74/491

(58) Field of Classification Search .............. 477/170, 477/171; 192/12 R, 13 A, 114 R; 74/490.14, 74/490.15, 491
See application file for complete search history.

(56) References Cited

U.S. PATENT DOCUMENTS

| | | | |
|---|---|---|---|
| 3,960,030 A | 6/1976 | Williams | |
| 4,316,531 A * | 2/1982 | Harpster | 192/114 R |
| 4,667,785 A | 5/1987 | Toyoda et al. | |
| 4,785,683 A | 11/1988 | Buckley et al. | |
| 6,412,583 B1 | 7/2002 | Caple | |
| 6,835,904 B2 | 12/2004 | McGuire et al. | |
| 7,395,909 B2 | 7/2008 | Hutchison | |
| 7,992,690 B2 * | 8/2011 | Cross | 188/24.18 |
| 2006/0076197 A1 | 4/2006 | Ishida | |
| 2008/0011563 A1 | 1/2008 | Yamamoto | |

FOREIGN PATENT DOCUMENTS

| | | | |
|---|---|---|---|
| EP | 764574 A1 * | 3/1997 | |
| JP | 59105944 A * | 6/1984 | |
| WO | 0050295 | 8/2000 | |

* cited by examiner

*Primary Examiner* — Tisha Lewis
(74) *Attorney, Agent, or Firm* — Ulmer & Berne LLP (57) ABSTRACT

An integrated parking brake and clutch control system for a vehicle is provided that includes a clutch perch configured for mounting on a handlebar assembly of a vehicle. A clutch lever is pivotably coupled to the clutch perch and is pivotable between rest and clutch-applied positions, and between the rest position and a parking-brake-applied position. A brake lever is pivotably coupled to the clutch perch and is pivotable between rest and depressed positions. A lock pin is supported by and moveable with the brake lever. The clutch lever defines a pin-receiving aperture and is configured to receive respective ends of a clutch cable and a parking brake cable. The lock pin is selectively insertable into the pin-receiving aperture when the clutch lever is in the parking-brake-applied position, which prevents the clutch lever from pivoting to either the rest position or the clutch-applied position.

20 Claims, 9 Drawing Sheets

INTEGRATED PARKING BRAKE AND CLUTCH CONTROL SYSTEM

TECHNICAL FIELD

The invention relates generally to a control system for a vehicle and, more particularly, to an integrated parking brake and clutch control system for a vehicle.

BACKGROUND

All terrain vehicles can include a manually operated clutch and a parking brake. A clutch lever and a brake lever, used to apply the clutch and parking brake, respectively, can be mounted in close proximity to one another on a handlebar assembly of the vehicle. However, with some known configurations, application of the parking brake can be awkward or cumbersome due to the nature of the multiple steps that can be required.

SUMMARY

According to one embodiment, an integrated parking brake and clutch control system for a vehicle is provided. The system includes a clutch perch configured for mounting on a handlebar assembly of a vehicle. The system further includes a clutch lever pivotably coupled to the clutch perch, with the clutch lever being pivotable between a rest position and a clutch-applied position, and between the rest position and a parking-brake-applied position. The system also includes a brake lever pivotably coupled to the clutch perch, with the brake lever being pivotable between a rest position and a depressed position. The system further includes a lock pin supported by, and moveable with, the brake lever. The clutch lever defines a pin-receiving aperture and is configured to receive respective ends of a clutch cable and a parking brake cable of a vehicle. The lock pin is selectively insertable into the pin-receiving aperture when the clutch lever is in the parking-brake-applied position such that the clutch lever is prevented from pivoting to either of the rest position or the clutch-applied position.

According to another embodiment, a vehicle is provided that includes a frame, at least one front wheel suspended from the frame, at least one rear wheel suspended from the frame, a source of motive power supported by the frame and a transmission supported by the frame and coupled to at least one of the front and rear wheels. The vehicle further includes a clutch that selectively couples the source of motive power and the transmission. The vehicle also includes a parking brake associated with one of the front and rear wheels and a handlebar assembly coupled to the frame and operable for steering the at least one front wheel. The vehicle also includes an integrated parking brake and clutch control system that includes a clutch perch mounted on the handlebar assembly and a clutch lever pivotably coupled to the clutch perch. The clutch lever is pivotable between a rest position and a clutch-applied position, and between the rest position and a parking-brake-applied position. The clutch lever is connected to the clutch and the parking brake. The integrated parking brake and clutch control system further includes a brake lever and a lock pin. The brake lever is pivotably coupled to the clutch perch and is pivotable between a rest position and a depressed position. The lock pin is supported by, and moveable with, the brake lever. The clutch lever defines a pin-receiving aperture. The lock pin is selectively insertable into the pin-receiving aperture when the clutch lever is in the parking-brake-applied position such that the clutch lever is prevented from pivoting to either of the rest position or the clutch applied position.

BRIEF DESCRIPTION OF THE DRAWINGS

Various embodiments according to the inventive principles will become better understood with regard to the following description, appended claims and accompanying drawings wherein:

DETAILED DESCRIPTION

Figure 1:
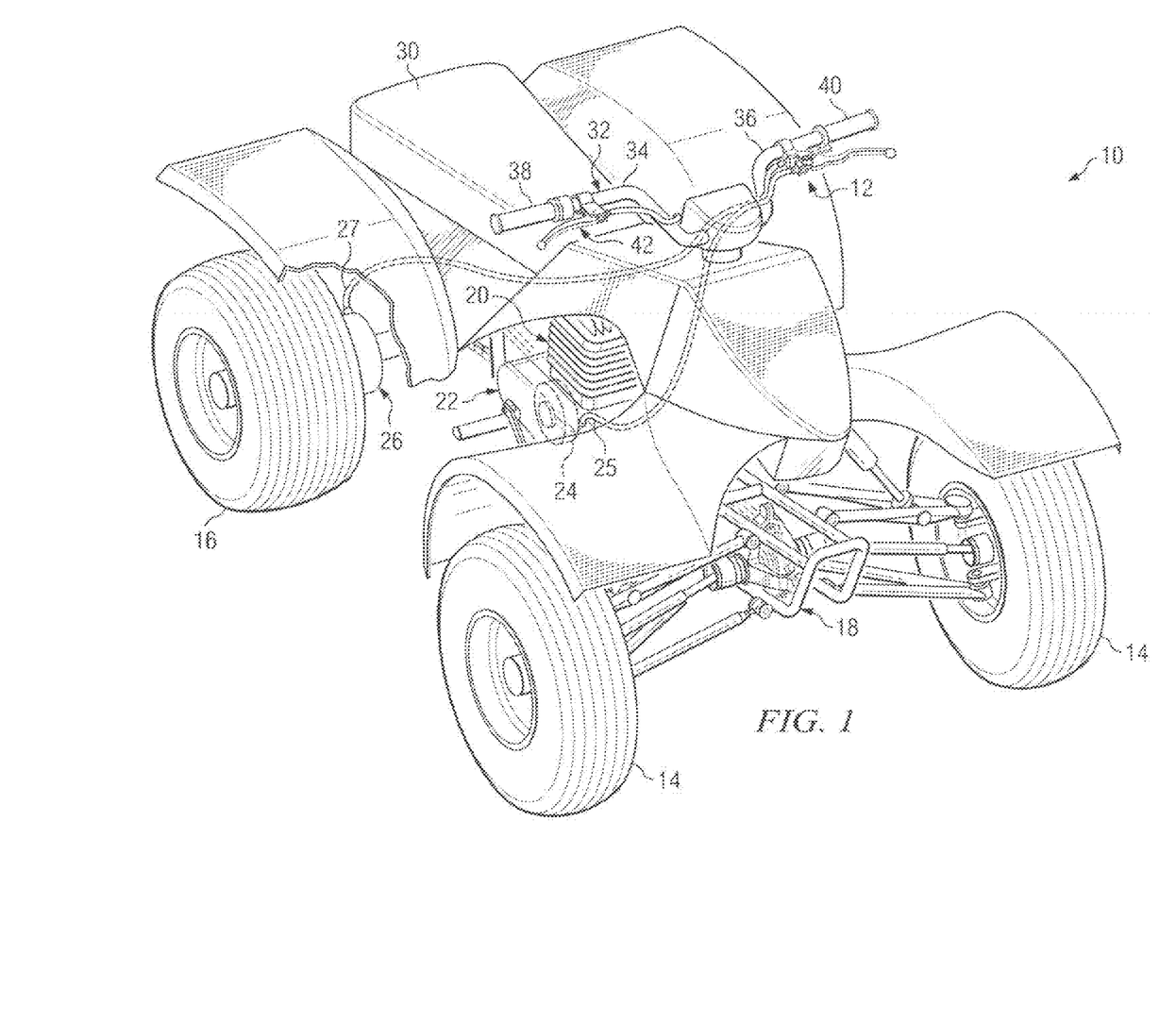
FIG. 1 is a perspective view illustrating a vehicle that includes an integrated parking brake and clutch control system according to one embodiment.
Figure 2A:
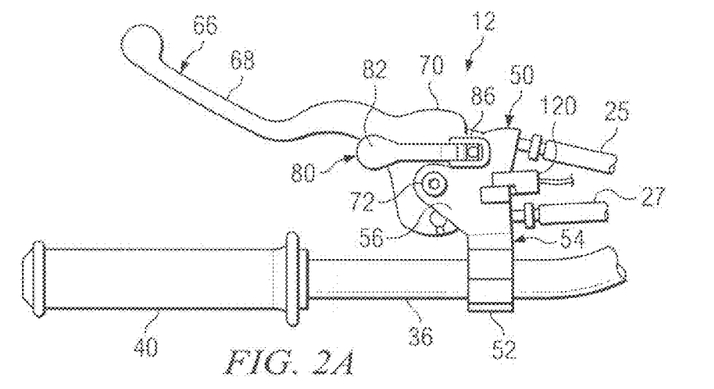
FIG. 2A is a top plan view of the integrated parking brake and clutch control system shown in claim 1, with the clutch lever being shown in a rest position.
Figure 2B:
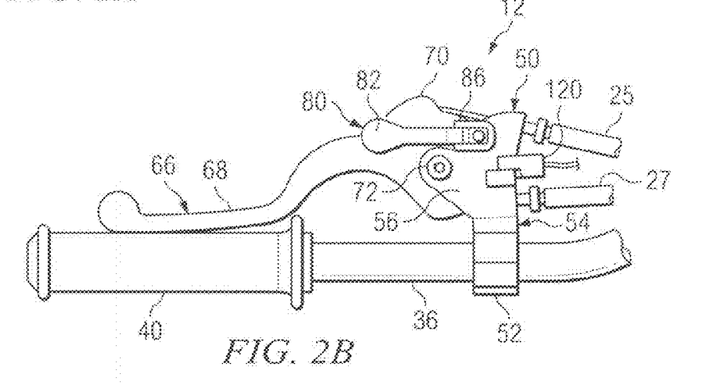
FIG. 2B is a top plan view similar to FIG. 2A, but with the clutch lever being shown in a clutch-applied position.
Figure 2C:
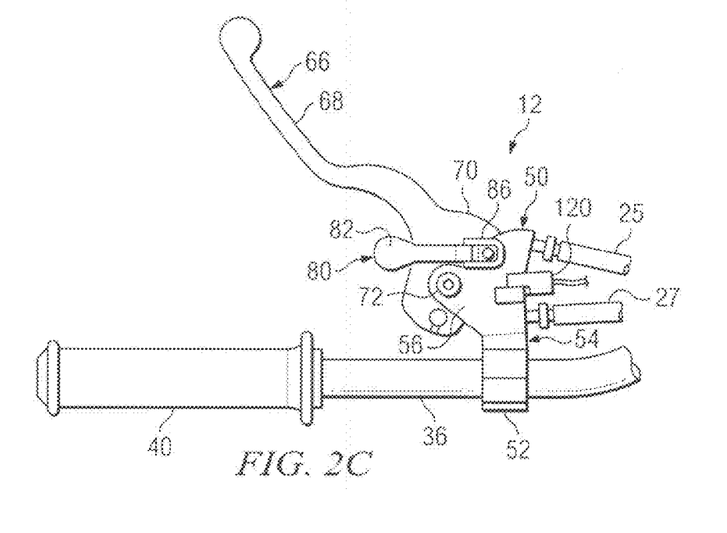
FIG. 2C is a top plan view similar to FIGS. 2A and 2B, but with the clutch lever being shown in a parking-brake-applied position.

Referring to the drawings, wherein like numbers indicate the same or corresponding elements throughout the views, FIG. 1 illustrates a vehicle 10 that includes an integrated parking brake and clutch control system 12, according to one embodiment. Integrated parking brake and clutch control systems according to the inventive principles can be used with an all terrain vehicle (ATV) such as vehicle 10 shown in FIG. 1, or with a variety of other saddle-type or other vehicles configured for recreational and/or utility purposes.

Vehicle 10 can include a pair of front wheels 14 and a pair of rear wheels 16 (one shown). Vehicle 10 can include a frame, indicated generally at 18. Front wheels 14 and rear wheels 16 can be suspended from frame 18 and are rotatable relative to frame 18. Vehicle 10 further includes a source of motive power 20, which can be an internal combustion engine, an electric motor or any other suitable source of motive power. The source of motive power 20 can be drivingly connected to a drivetrain that is operable for transferring torque to the front wheels 14 and/or the rear wheels 16. The drivetrain can include a transmission 22 that can be driven by the source of motive power. The drivetrain can also include a clutch 24 that can be operable for coupling and uncoupling the source of motive power 20 with the transmission 22. A clutch cable 25 can be connected at one end to clutch 24 and at the opposite end to the integrated parking brake clutch control system 12. Vehicle 10 can also include a parking brake 26 that can be associated with one or more of the wheels of vehicle 10, for example, with one of the rear wheels 16 as shown in FIG. 1. A parking brake cable 27 can be connected at one end to the parking brake 26 and at the opposite end to the integrated parking brake and clutch control system 12.

Vehicle 10 can further include a seat 30 that is suitable for supporting an operator of vehicle 10, and a handlebar assembly 32 configured for turning the front wheels 14 to steer vehicle 10. Handlebar assembly 32 can include a right handlebar 34 and a left handlebar 36. The right handlebar 34 can include a right handgrip 38 and the left handlebar 36 can include a left handgrip 40. Vehicle 10 can include a hand brake 42 which can be secured to the handlebar assembly 32. As shown in FIG. 1, the handbrake 42 can be secured to the right handlebar 34. The integrated parking brake and clutch control system 12 can also be mounted on the handlebar assembly 32. As shown in FIG. 1, the integrated parking brake and clutch control system 12 can be mounted on the left handlebar 36. However, in other embodiments, an integrated parking brake and clutch control system can be provided that is mounted to a right handlebar of a handlebar assembly.

Figures 3A, 4A:
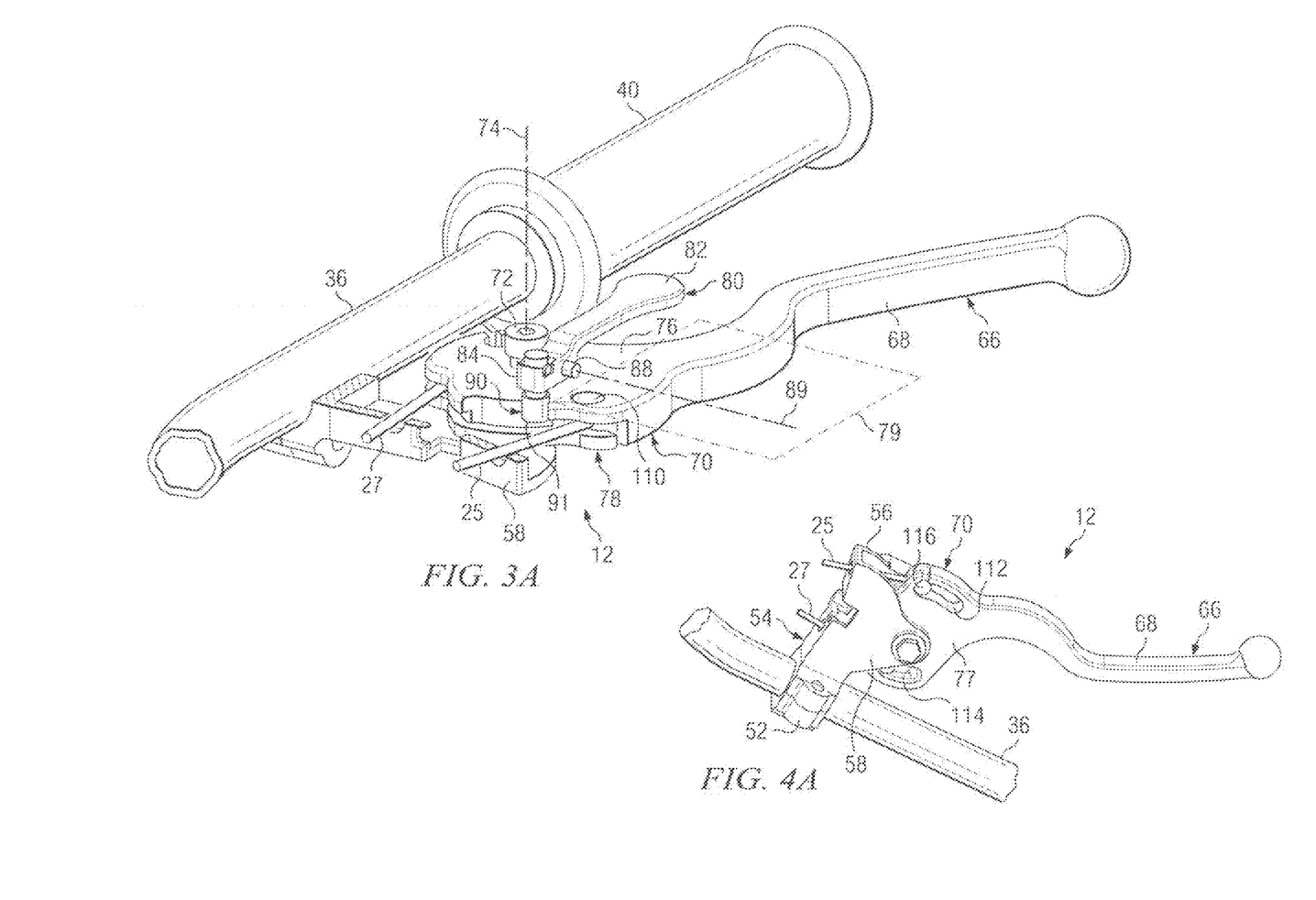
FIG. 3A is a top perspective view corresponding to FIG. 2A, but with a portion of the clutch perch not shown for clarity of illustration.
FIG. 4A is a bottom perspective view corresponding to FIG. 2A, but with the handgrip of the handlebar assembly not shown.
Figures 3B, 4B:
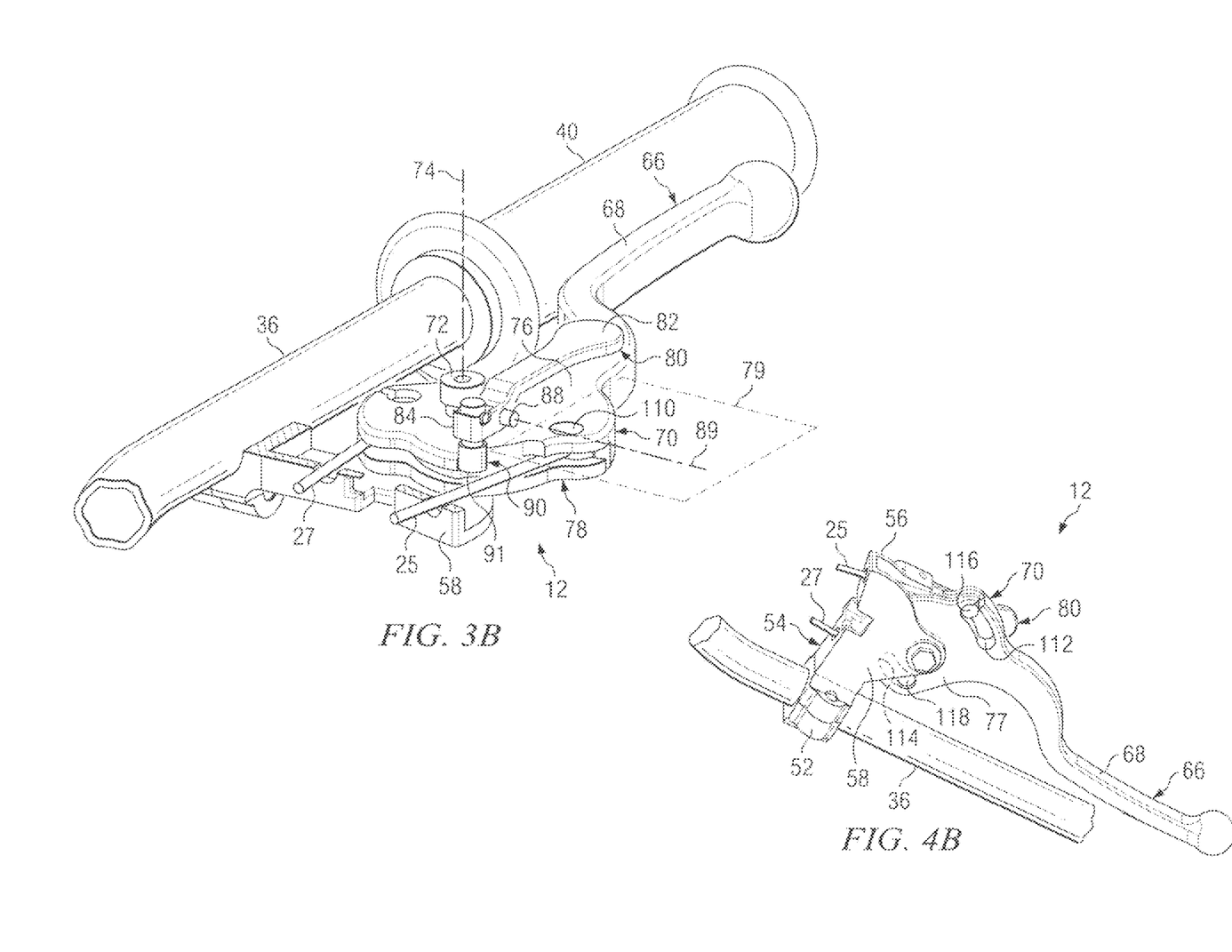
FIG. 3B is a top perspective view corresponding to FIG. 2B, but with a portion of the clutch perch not shown for clarity of illustration.
FIG. 4B is a bottom perspective view corresponding to FIG. 2B, but with the handgrip of the handlebar assembly not shown.
Figures 3C, 4C:
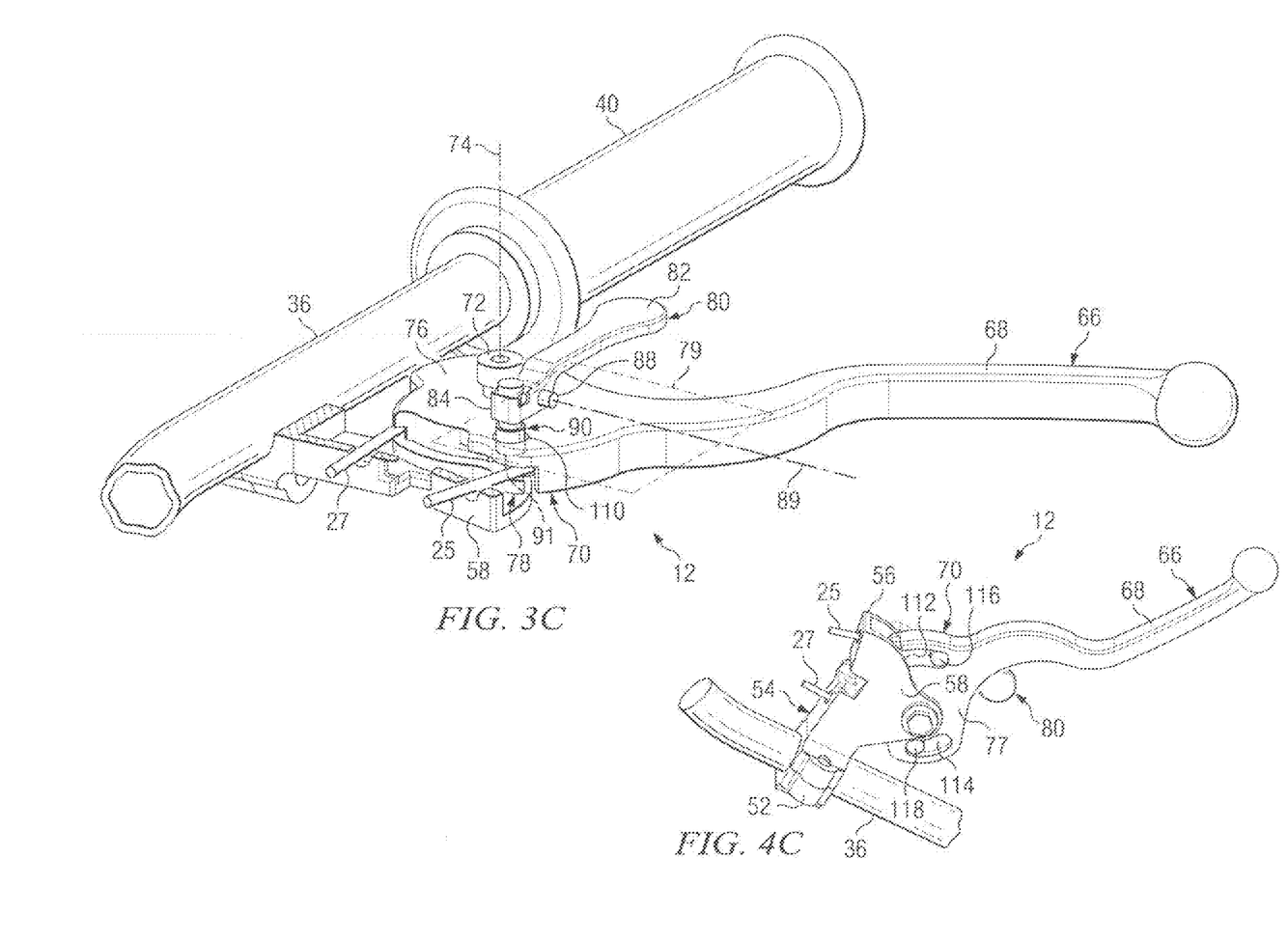
FIG. 3C is a top perspective view corresponding to FIG. 2C, but with a portion of the clutch perch not shown for clarity of illustration.
FIG. 4C is a bottom perspective view corresponding to FIG. 2C, but with the handgrip of the handlebar assembly not shown.

Referring to FIGS. 2A, 2B, 2C, 3A, 3B, 3C, 4A, 4B, 4C, 5A, 5B, 5C, 6, 7A and 7B, the integrated parking brake and clutch control system 12 can include a clutch perch 50 mounted on the handlebar assembly 32. For example, the clutch perch 50 can be mounted on the left handlebar 36. In this regard, the clutch perch 50 can include a mount bracket 52, that can partially surround one of the handlebars, such as handlebar 36, and a clutch lever receiver 54 that can be secured to the mount bracket 52 with conventional fasteners (not shown). The clutch lever receiver 54 can include first and second flanges 56, 58 that are spaced apart from one another as shown in FIGS. 4A, 4B and 4C.

The integrated parking brake and clutch control system 12 can further include a clutch lever 66 that can be pivotably coupled to the clutch perch 50. The clutch lever 66 can include a proximal portion 68 and a distal portion 70. The proximal portion 68 can be configured to facilitate grasping the clutch lever 66. The clutch lever 66 can be pivotably coupled to the clutch perch 50 with a pivot pin 72 that extends transversely through the clutch perch 50 and the distal portion 70 of clutch lever 66. The clutch lever 66 can be pivotable about an axis 74 (FIGS. 3A, 3B and 3C). As will be appreciated with reference to FIGS. 2A-2C and 4A-4C, the distal portion 70 of the clutch lever 66 can be positioned, in part, between the flanges 56, 58 of the clutch lever receiver 54 of the clutch perch 50. Referring to FIGS. 3A-3C and 4A-4C, the distal portion 70 of the clutch lever 66 can include an upper surface 76, a lower surface 77 and an edge 78 that extends between the upper and lower surfaces 76, 77. The upper surface 76 of the distal portion 70 of clutch lever 66 can define a plane 79 (FIGS. 3A-3C), and the axis 74 can be transverse to plane 79.

The clutch lever 66 can be pivotable between a rest position shown in FIGS. 2A, 3A, 4A and 5A, and a clutch-applied position shown in FIGS. 2B, 3B, 4B and 5B. The clutch lever 66 can also be pivotable between the rest position shown in FIGS. 2A, 3A, 4A and 5A, and a parking-brake-applied position shown in FIGS. 2C, 3C, 4C and 5C.

Figure 6:
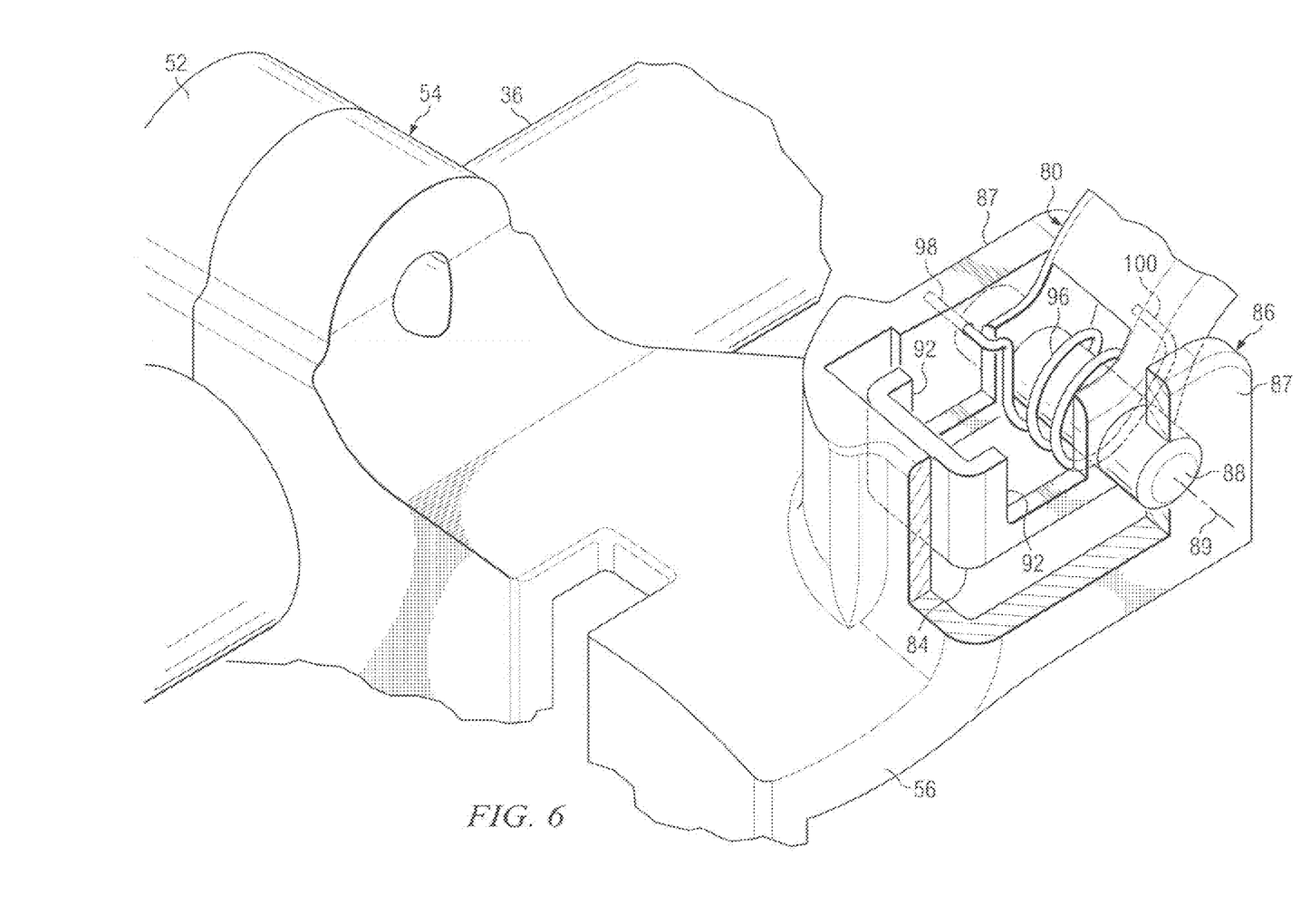
FIG. 6 is an enlarged perspective view of portions of the clutch perch and brake lever of the integrated parking brake and clutch control system shown in FIG. 1.

The integrated parking brake and clutch control system 12 can also include a brake lever 80 that can be pivotably coupled to the clutch perch 50. The brake lever 80 can be pivotable between a rest position best seen in FIG. 7A and a depressed position best seen in FIG. 7B. As shown in FIGS. 3A, 3B and 3C, brake lever 80 can include a proximal portion 82 and a distal portion 84. The clutch perch 50 can include a clevis bracket 86 (FIG. 6). The clevis bracket 86 can be positioned above the upper surface 76 of the distal portion 70 of clutch lever 66. As will be appreciated with reference to FIG. 6, the distal portion 84 of the brake lever 80 can be at least partially disposed within clevis bracket 86, between a pair of opposing walls 87 of bracket 86. The distal portion 84 of brake lever 80 can be pivotably coupled to the clevis bracket 86 of perch 50 with a pivot pin 88 that extends transversely through the clevis bracket 86 and the distal portion 84 of brake lever 80. The brake lever 80 can pivot about an axis 89 that can be generally parallel to the plane 79 (shown in FIGS. 3A, 3B and 3C) defined by the upper surface 76 of the distal portion 70 of the clutch lever 66.

Figure 7A:
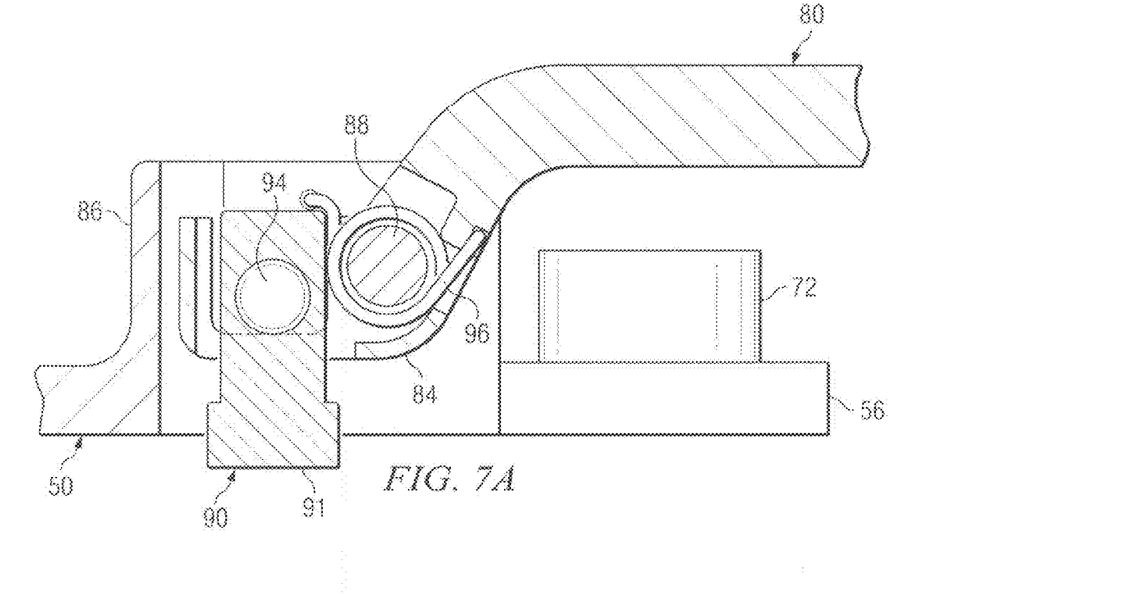
FIG. 7A is an enlarged side view, partially in cross section, of the portions of the clutch perch and brake lever shown in FIG. 6, with the brake lever being shown in a rest position.
Figure 7B:
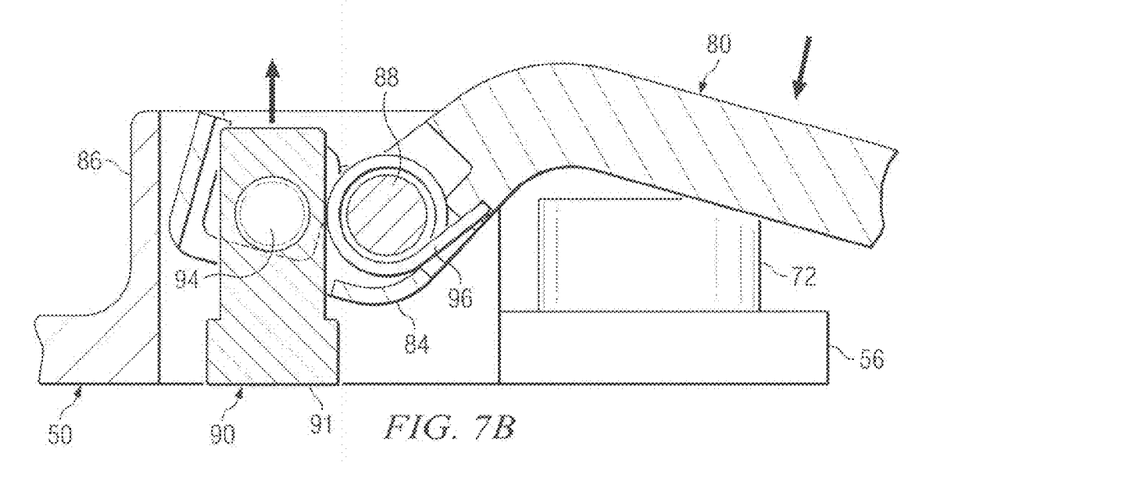
FIG. 7B is an enlarged side view similar to FIG. 7A, but with the brake lever being shown in a depressed position.

Referring to FIGS. 7A and 7B, the integrated parking brake and clutch control system 12 can further include a lock pin 90 that is supported by, and moveable with, the brake lever 80. FIGS. 7A and 7B illustrate a portion of brake lever 801 with brake lever 80 in the rest and depressed positions, respectively. The lock pin 90 can move upward as the brake lever 80 is depressed (i.e., when the proximal portion 82 of brake lever 80 is depressed, or pushed downward). The distal portion 84 of the brake lever 80 can include a pair of opposing guide slots 92 (FIG. 6), which can be located distally of pivot pin 88 relative to the brake lever 80. System 12 can further include a guide pin 94 (FIGS. 7A and 7B) that extends transversely through the lock pin 90. The guide pin 94 can be at least partially positioned within the guide slots 92, such that the lock pin 90 can be supported by the distal portion 84 of brake lever 80 and located distally of pivot pin 88 relative to brake lever 80.

System 12 can further include a biasing member 96 (FIGS. 6, 7A and 7B) that can bias the brake lever 80 toward the rest position shown in FIG. 7A. As shown in FIGS. 6, 7A and 7B, the biasing member 96 can be a torsion spring that can be wound around the pivot pin 88 and can be coupled with the clutch perch 50 and the brake lever 80. As shown in FIG. 6, a first end 98 of the biasing member 96 can engage the perch 50, and a second end 100 of the biasing member 96 can engage brake lever 80. For example, the ends 98, 100 can be inserted into apertures in the clevis bracket 86 of perch 50 and the distal portion 84 of brake lever 80, respectively.

Figure 5A:
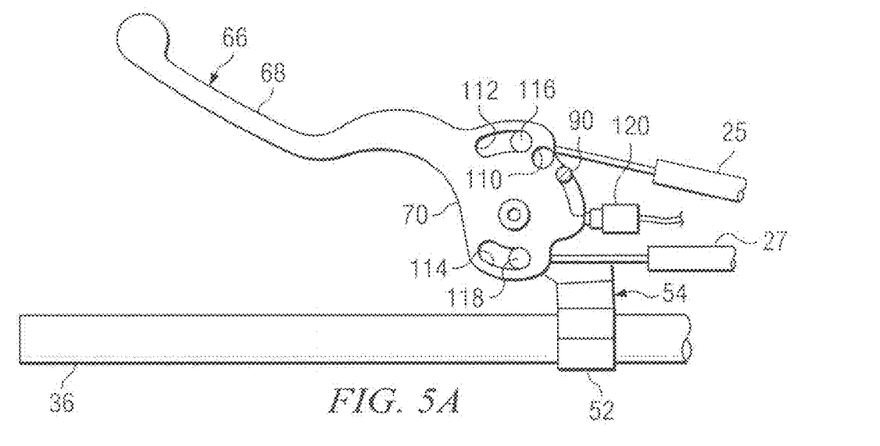
FIG. 5A is a schematic view illustrating relative positions of the clutch lever, lock pin, parking brake cable, clutch cable, and in-start switch, with the clutch lever in the rest position.
Figure 5B:
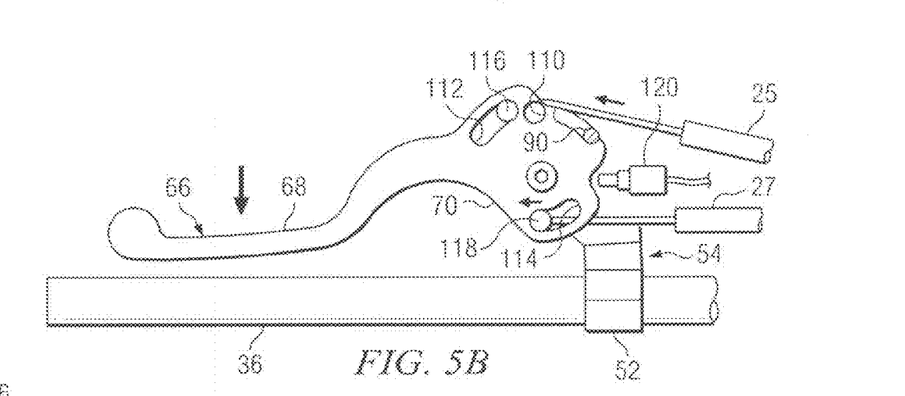
FIG. 5B is a schematic view similar to FIG. 5A, but with the clutch lever shown in the clutch-applied position.
Figure 5C:
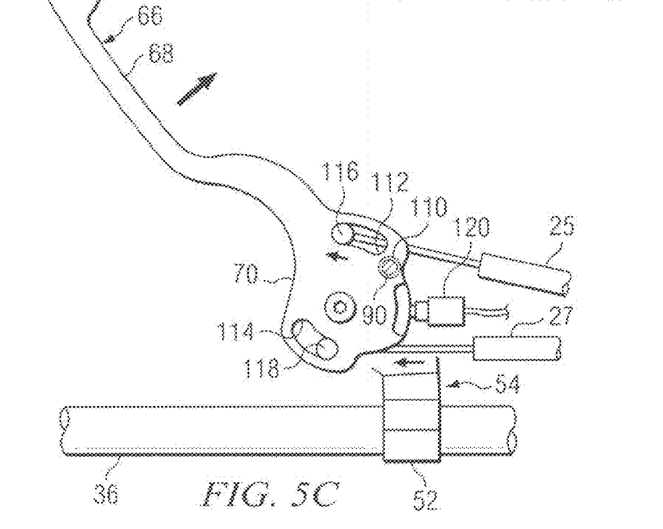
FIG. 5C is a schematic view similar to FIGS. 5A and 5B, but with the clutch lever being shown in a parking-brake-applied position.

The distal portion 70 of clutch lever 66 can define a pin-receiving aperture 110 (shown in FIGS. 3A-3C and 5A-5C) that can extend through the upper surface 76 of the distal portion 70 of clutch lever 66. The distal portion 70 of clutch lever 66 can be configured for connection to the clutch cable 25 and the parking brake cable 27. More particularly, as shown in FIGS. 5A, 5B and 5C, the distal portion 70 of the clutch lever 66 can include a first arcuate slot 112 and a second arcuate slot 114. One end of the clutch cable 25 can include a ferrule 116 that can be received within the first arcuate slot 112, and one end of the parking brake cable 27 can include a ferrule 118 that can be received within the second arcuate slot 114. The arcuate shape of slots 112 and 114 can accommodate the relative movement between ferrules 116, 118 and clutch lever 66 as the clutch lever 66 pivots about axis 74. Edge 78 of the distal portion 70 of clutch lever 66 can include one or more slots to receive clutch cable 25 and parking brake cable 27 as shown in FIGS. 3A, 3B and 3C.

When the clutch lever 66 is in the rest position shown in FIGS. 2A, 3A, 4A, and 5A, no load is applied by the clutch lever 66 to either the clutch cable 25 or the parking brake cable 27, such that the clutch 24 and parking brake 26 are not applied. When the clutch lever 66 is in the clutch-applied position shown in FIGS. 2B, 3B, 4B, and 5B, the clutch lever 66 applies a tensile load to the clutch cable 25, such that the clutch 24 can be applied and the source of motive power 20 can be coupled to transmission 22. When the clutch lever 66 is in the clutch-applied position, no load is applied by the clutch lever 66 to the parking brake cable 27, such that the parking brake 26 can remain disengaged. When the clutch lever 66 is in the parking-brake-applied position shown in FIGS. 2C, 3C, 4C and 5C, the clutch lever 66 applies a tensile load to the parking brake cable 27, such that the parking brake 26 can be applied. In this position no load is applied by the clutch lever 66 to the clutch cable 25.

Vehicle 10 can also include an in-start switch 120 (shown in FIGS. 3A-3C and 5A-5C) that can be in electrical communication with a component, such as a starter, of a system used to selectively start vehicle 10. The in-start switch 120 can be mounted on the clutch perch 50. The in-start switch 120 can comprise a normally closed pushbutton and can be positioned such that it is spaced apart from the clutch lever 66 when the clutch lever 66 is in the clutch-applied position (see FIG. 5B), such that an engine starter, or other component, is energized for starting an associated engine. The in-start switch 120 can also be positioned such that a movable portion of switch 120 is in contacting engagement with the distal portion 70 of clutch lever 66 when the clutch lever 66 is in either the rest position or the parking-brake-applied position (see FIGS. 5A and 5C, respectively), such that an electrical start circuit is open, and vehicle 10 can not be started. In other embodiments, an in-start switch can be provided that comprises a normally open pushbutton in any of a variety of other arrangements with a clutch lever, and a variety of other types of in-start switches can be provided.

Referring to FIGS. 3A, 3B and 3C, when the clutch lever 66 is in the rest position, a portion of the lock pin 90, which can be a lower portion 91, can be positioned proximate the edge 78 of the distal portion 70 of the clutch lever 66 as shown in FIG. 3A. The edge 78 can be contoured such that the lower portion 91 of lock pin 90 remains proximate the edge 78, as the clutch lever is rotated from the rest position to the clutch-applied position, which is shown in FIG. 3B. Prior to pivoting the clutch lever 66 toward the parking-brake-applied position, the brake lever 80 can be depressed such that the distal portion 84 of brake lever 80 forces the lock pin 90 upward and the lower portion 91 of lock pin 90 can be higher than the upper surface 76 of the distal portion 70 of clutch lever 66. As the clutch lever 66 is being pivoted toward the parking-brake-applied position, the brake lever 80 can be released. When the brake lever 80 is released, the biasing member 96 can bias the brake lever 80 toward the rest position. This can cause the distal portion 84 of brake lever 80 and the lock pin 90 to move downward, such that the lower portion 91 of lock pin 90 contacts the upper surface 76 of the distal portion 70 of brake lever 66. When brake lever 66 has been fully pivoted from the rest position to the parking-brake-applied position, the lock pin 90 can be aligned with the pin-receiving aperture 110 defined by the distal portion 70 of clutch lever 66 so that the lower portion 91 of the lock pin 90 can "snap" into the pin-receiving aperture 110, which prevents the clutch lever 66 from pivoting from the parking-brake-applied position to either the rest position or the clutch-applied position until the brake lever 80 is again depressed. Therefore, it will be appreciated that application of the parking brake 26 of a vehicle, such as vehicle 10, can be achieved in a simple and intuitive manner, requiring minimal steps.

Figure 8:
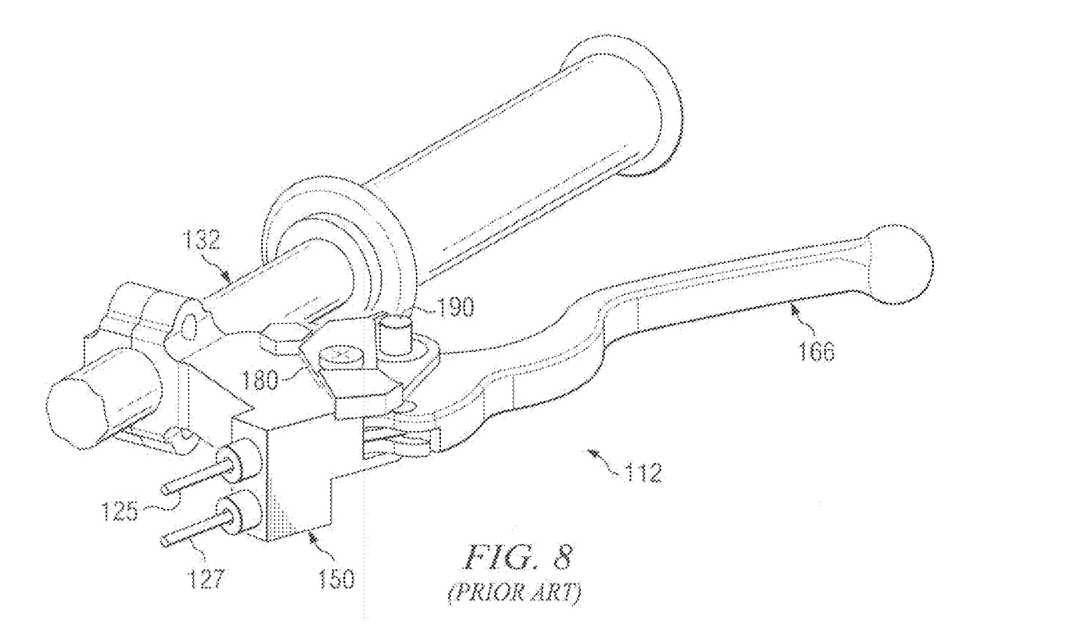
FIG. 8 is a perspective view of a prior art clutch and parking brake control system.

In contrast, the control systems used on some conventional all terrain vehicles to apply a parking brake and a clutch can require multiple steps that can be awkward, or cumbersome, such that application of the parking brake is not intuitive and can inconvenience an operator of the vehicle. An example of such a control system is shown in Prior Art FIG. 8, which illustrates a conventional control system 112 that can be used to apply a clutch (not shown) and a parking brake (not shown). The control system 112 includes a clutch perch 150 mounted to a handlebar assembly 132 of a vehicle, such as an all terrain vehicle. A clutch lever 166 and a brake lock lever 180 are each pivotably coupled to the clutch perch 150. A clutch cable 125 is connected to the clutch and the clutch lever 166, and a parking brake cable 127 is connected to the parking brake and the clutch lever 166. To apply the parking brake, an operator of the vehicle must perform the following steps: depress a parking brake button 190; pull the clutch lever 166 toward the handlebar assembly 132 so it pivots from a rest position shown in FIG. 8 to a clutch-applied position (not shown) adjacent the handlebar assembly 132; keep the parking brake button 190 depressed and rotate or pivot the brake lock lever 180 until it is over the parking brake button 190, forcing the parking brake button 190 to remain depressed; and release the clutch lever 166 so it returns to the rest position shown in FIG. 8, while holding the brake lock lever 180.

While the inventive principles have been illustrated by the description of various embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus, methods and examples shown and described. Accordingly, departures may be made from such details without departing from the scope or spirit of the general inventive principles.

What is claimed is:

1. An integrated parking brake and clutch control system for a vehicle, the system comprising:
   a clutch perch configured for mounting on a handlebar assembly of a vehicle;
   a clutch lever pivotably coupled to the clutch perch, the clutch lever being pivotable between a rest position and a clutch-applied position, and between the rest position and a parking-brake-applied position:
   a brake lever pivotably coupled to the clutch perch, the brake lever being pivotable between a rest position and a depressed position; and
   a lock pin supported by, and moveable with, the brake lever; wherein
   the clutch lever defines a pin-receiving aperture and is configured to receive respective ends of a clutch cable and a parking brake cable of a vehicle; and
   the lock pin is selectively insertable into the pin-receiving aperture when the clutch lever is in the parking-brakeapplied position such that the clutch lever is prevented from pivoting to either of the rest position or the clutch-applied position.

2. The integrated parking brake and clutch control system of claim 1, further comprising:
a biasing member coupled with each of the clutch perch and the brake lever and configured to bias the brake lever toward the rest position.

3. The integrated parking brake and clutch control system of claim 2, wherein:
the biasing member comprises a torsion spring.

4. The integrated parking brake and clutch control system of claim 1, wherein:
the clutch lever comprises a proximal portion and a distal portion;
the distal portion of the clutch lever comprises an upper surface that defines a plane;
the clutch lever is pivotable about a first axis;
the brake lever is pivotable about a second axis; and
the first axis is transverse to the plane defined by the upper surface of the distal portion of the clutch lever; and
the second axis is generally parallel to the plane defined by the upper surface of the distal portion of the clutch lever.

5. The integrated parking brake and clutch control system of claim 4, wherein:
the distal portion of the clutch lever defines the pin-receiving aperture and further comprises a lower surface and an edge extending between the upper surface and the lower surface;
the pin-receiving aperture extends through the upper surface of the distal portion of the clutch lever; and
the lock pin is positioned proximate the edge of the distal portion of the clutch lever when the brake lever is in the rest position and as the clutch lever is selectively pivoted between the rest position and the clutch-applied position.

6. The integrated parking brake and clutch control system of claim 5, wherein:
the clutch perch comprises a clevis bracket;
the brake lever comprises a proximal portion and a distal portion, the distal portion of the brake lever being pivotably coupled to the clevis bracket of the clutch perch.

7. The integrated parking brake and clutch control system of claim 6, further comprising:
a pivot pin; wherein
the distal portion of the brake lever is pivotably coupled to the clevis bracket of the clutch perch with the pivot pin;
the lock pin extends through, and is supported by, the distal portion of the brake lever;
the lock pin is positioned distally from the pivot pin relative to the brake lever.

8. The integrated parking brake and clutch control system of claim 7, further comprising:
a guide pin, the guide pin extending transversely through the lock pin; wherein:
the distal portion of the brake lever defines a pair of opposing guide slots, the guide slots being located distally of the pivot pin relative to the brake lever; and
the guide pin is positioned at least partially within each of the guide slots.

9. The integrated parking brake and clutch control system of claim 4, wherein:
the distal portion of the clutch lever comprises first and second arcuate slots;
the first arcuate slot is configured to receive an end of a clutch cable of a vehicle; and the second arcuate slot is configured to receive an end of a parking brake cable of a vehicle.

10. A vehicle comprising:
a frame;
at least one front wheel suspended from the frame;
at least one rear wheel suspended from the frame;
a source of motive power supported by the frame;
a transmission supported by the frame and coupled to at least one of the front and rear wheels;
a clutch, the clutch selectively coupling the source of motive power and the transmission;
a parking brake associated with one of the front and rear wheels;
a handlebar assembly coupled to the frame and operable for steering the at least one front wheel; and
an integrated parking brake and clutch control system comprising:
a clutch perch mounted on the handlebar assembly;
a clutch lever pivotably coupled to the clutch perch, the clutch lever being pivotable between a rest position and a clutch-applied position, and between the rest position and a parking-brake-applied position, the clutch lever being connected to the clutch and the parking brake;
a brake lever pivotably coupled to the clutch perch, the brake lever being pivotable between a rest position and a depressed position; and
a lock pin supported by, and moveable with, the brake lever; wherein
the clutch lever defines a pin-receiving aperture; and
the lock pin is selectively insertable into the pin-receiving aperture when the clutch lever is in the parking-brake-applied position such that the clutch lever is prevented from pivoting to either of the rest position or the clutch-applied position.

11. The vehicle of claim 10, wherein the integrated parking brake and clutch control system further comprises:
a biasing member coupled with each of the clutch perch and the brake lever and configured to bias the brake lever toward the rest position.

12. The vehicle of claim 11, wherein:
the biasing member comprises a torsion spring.

13. The vehicle of claim 10, wherein:
the clutch lever comprises a proximal portion and a distal portion;
the distal portion of the clutch lever comprises an upper surface that defines a plane;
the clutch lever is pivotable about a first axis;
the brake lever is pivotable about a second axis; and
the first axis is transverse to the plane defined by the upper surface of the distal portion of the clutch lever; and
the second axis is generally parallel to the plane defined by the upper surface of the distal portion of the clutch lever.

14. The vehicle of claim 13, wherein:
the distal portion of the clutch lever defines the pin-receiving aperture and further comprises a lower surface and an edge extending between the upper surface and the lower surface;
the pin-receiving aperture extends through the upper surface of the distal portion of the clutch lever; and
the lock pin is positioned proximate the edge of the distal portion of the clutch lever when the brake lever is in the rest position and as the clutch lever is selectively pivoted between the rest position and the clutch-applied position.

15. The vehicle of claim 14, wherein:
the clutch perch comprises a clevis bracket positioned above the upper surface of the distal portion of the clutch lever;
the brake lever comprises a proximal portion and a distal portion, the distal portion of the brake lever being pivotably coupled to the clevis bracket of the clutch perch.

16. The vehicle of claim 15, further comprising:
a pivot pin; wherein
the distal portion of the brake lever is pivotably coupled to the clevis bracket of the clutch perch with the pivot pin;
the lock pin extends through, and is supported by, the distal portion of the brake lever; and
the lock pin is positioned distally from the pivot pin relative to the brake lever.

17. The vehicle of claim 16, wherein the integrated parking brake and clutch control system further comprises:
a guide pin, the guide pin extending transversly through the lock pin; wherein:
the distal portion of the brake lever defines a pair of opposing guide slots, the guide slots being located distally of the first pivot pin relative to the brake lever; and
the guide pin is positioned at least partially within each of the guide slots.

18. The vehicle of claim 10, further comprising:
a clutch cable, the clutch cable connecting the clutch and the clutch lever;
a parking brake cable, the parking brake cable connecting the parking brake and the clutch lever; wherein:
the clutch lever operably applies a tensile load to the clutch cable when the clutch lever is in the clutch-applied position; and
the clutch lever operably applies a tensile load to the parking brake cable when the clutch lever is in the parking-brake-applied position.

19. The vehicle of claim 18, further comprising:
an in-start switch supported by one of the parking brake cable, the clutch cable and the clutch perch; wherein
the in-start switch is in contacting engagement with the clutch lever when the clutch lever is in the rest position and when the clutch lever is in the parking-brake-applied position; and
the in-start switch is spaced apart from the clutch lever when the clutch lever is in the clutch-applied position.

20. The vehicle of claim 18, wherein:
the clutch lever comprises a proximal portion and a distal portion;
the distal portion of the clutch lever comprises first and second arcuate slots;
the first arcuate slot receives an end of the clutch cable; and
the second arcuate slot receives an end of the parking brake cable.

* * * * *

UNITED STATES PATENT AND TRADEMARK OFFICE
CERTIFICATE OF CORRECTION

PATENT NO. : 8,096,921 B2  Page 1 of 1
APPLICATION NO. : 12/480201
DATED : January 17, 2012
INVENTOR(S) : Timothy Adam Hahn It is certified that error appears in the above-identified patent and that said Letters Patent is hereby corrected as shown below:

Column 4, line 34, change "801" to -- 80, --.

Signed and Sealed this
Twentieth Day of March, 2012

David J. Kappos
*Director of the United States Patent and Trademark Office*